United States Patent [19]

Rossiter

[11] 4,451,414
[45] May 29, 1984

[54] APPARATUS AND METHOD FOR CONTROLLING EXTRUSION BACK PRESSURE UTILIZING A SINGLE SLEEVE DIE

[75] Inventor: Paul H. Rossiter, Royersford, Pa.

[73] Assignee: Welding Engineers, Inc., King of Prussia, Pa.

[21] Appl. No.: 393,051

[22] Filed: Jun. 28, 1982

[51] Int. Cl.³ .............................................. B29F 3/04
[52] U.S. Cl. .................... 264/40.5; 264/40.7; 264/142; 425/145; 425/149; 425/308; 425/311; 425/313; 425/382 R; 425/465
[58] Field of Search ...................... 264/40.5, 40.7, 142; 425/382 R, 308, 311, 331, 313, 465, 146, 142, 183, 149, 184, 185, 145

[56] References Cited

U.S. PATENT DOCUMENTS

| | | | |
|---|---|---|---|
| 2,162,647 | 6/1939 | Sizer | 425/464 |
| 3,308,507 | 3/1967 | Black | 425/311 |
| 3,861,844 | 1/1975 | Miller | 425/376 B |
| 3,867,082 | 2/1975 | Lambertus | 425/464 |
| 3,912,439 | 10/1975 | Newman, Jr. | 425/464 |
| 3,973,890 | 8/1976 | Porter et al. | 425/311 |
| 4,071,307 | 1/1978 | Porro | 425/464 |
| 4,088,433 | 5/1978 | Simpson | 425/464 |
| 4,104,015 | 8/1978 | Meyer | 425/463 |

FOREIGN PATENT DOCUMENTS

| | | | |
|---|---|---|---|
| 1210547 | 1/1960 | Fed. Rep. of Germany | 425/183 |
| 2557166 | 2/1977 | Fed. Rep. of Germany | 425/313 |

Primary Examiner—Jeffery R. Thurlow
Attorney, Agent, or Firm—Austin R. Miller

[57] ABSTRACT

In a face cutting apparatus having an extrudate feed means with an extrudate delivery end, a die plate and a cutter, an apparatus and method for controlling extrusion back pressure includes a die having a plurality of extrusion orifices through which a heat plastified material is adapted to be extruded, having a varying orifice density along the length of the die, a pressure sensing device for sensing the pressure adjacent the delivery end and an apparatus for moving the die relative to the delivery end in response to changes in the pressure adjacent the delivery end to align a die area of differing orifice density with the delivery end in order to adjust the flow rate of heat plastified material through the die and the extrusion back pressure.

4 Claims, 4 Drawing Figures

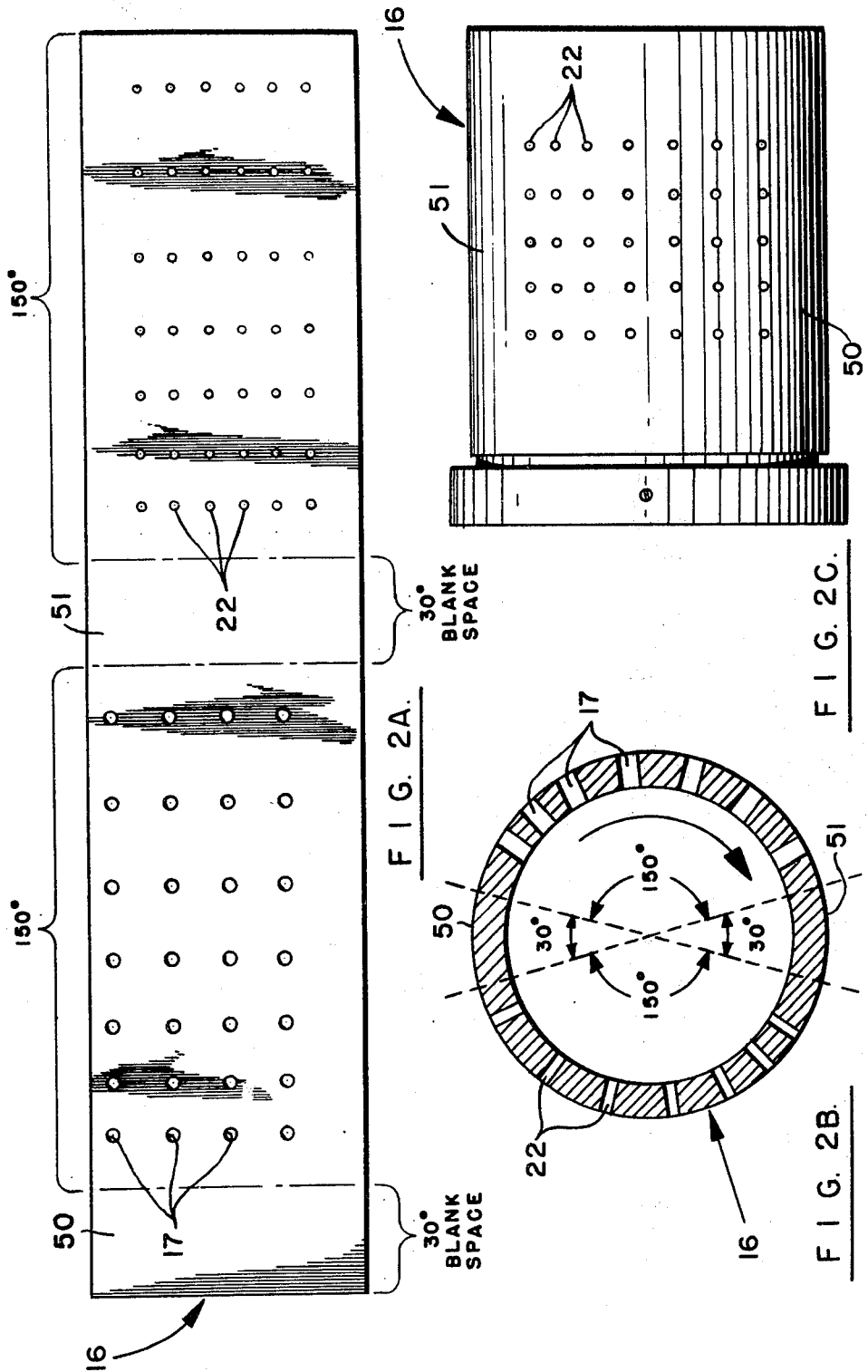

APPARATUS AND METHOD FOR CONTROLLING EXTRUSION BACK PRESSURE UTILIZING A SINGLE SLEEVE DIE

BACKGROUND OF THE INVENTION

1. Field of the Invention

This invention relates to adjustable die face pelletizers and specifically to a face-cutting apparatus for making pellets of thermoplastic material while controlling the extrusion back pressure in the thermoplastic extruder.

2. Description of the Prior Art

A face-cutting apparatus of the type described is disclosed in U.S. Pat. No. 3,973,890. In such an apparatus, the die plate means associated with the thermoplastic extruder is hollow and cylindrically shaped and is provided with radially extending extrusion orifices through which heat-plastified material is extruded by reason of the operation of a rotating feed screw which pressurizes the material upstream of the die plate means. The die plate means comprises a pair of nested die plates mounted for slight selective positioning for altering or adjusting the degree of alignment or misalignment of the orifices in the nested die plates, relative to one another.

The cutter in such a face cutting apparatus has a plurality of blades projecting radially from a cylindrical body and extending longitudinally therealong. At the free end of each blade is a cutting edge that is operatively associated with the downstream side of the die plate means, so that upon rotation of the cutter, heat-plastified material extruded through the orifices of the die plate means is sheared into pellets. Adjacent pairs of blades on the cutter and the intervening body portion establish continuous longitudinally extending channels into which the newly sheared pellets collect. A pellet treatment fluid is flushed through the channels formed by the cutter and the die plate means in order to sweep the pellets from the cutting edge of the blade as they are severed. The pellets are then collected at the downstream end of the cutter.

In the prior art devices the two die plates are rotatable with respect to one another. In one relative position, the orifices in the plates are exactly aligned to offer minimum resistance to the extrusion of heat-plastified material through the orifices. By changing the relative position of the two die plates, the resultant misalignment of the orifices introduces an obstruction at the inner face between the plates to the extrusion of material. Selective changes in the relative rotational position of the two nested die plates, in response to changes in the pressure of the heat-plastified material upstream of the die plates, maintains a substantially constant rate of extrusion. Furthermore, because the flow obstruction occurs at the inner face between the die plates, the cross-section of the material at the downstream face of the die plate closest to the cutter will be constant. Since the rate of extrusion is kept constant, the thickness of the pellets is uniform.

These prior art devices for maintaining extrusion flow rate by adjusting extrusion back pressure present several disadvantages.

First, the die plate means have a relatively short operating life. Thus, it is necessary to frequently shut down the thermoplastic extruders in order to replace worn die plates. Such a replacement operation becomes both time consuming and costly over the operating life of an extruder.

Secondly, it is desirable for an extruder to have the ability to produce thermoplastic pellets of varying diameters for different applications. In the prior art devices, the die plate means had only one set of extrusion orifices, all orifices having the same diameter. Hence, the prior art devices have no capability of producing more than one size of thermoplastic pellet. Instead, it was necessary to stop the machine, clean it and then replace the die plates with another set of die plates having different size orifices. As was mentioned above, this procedure is both time consuming and costly.

Thirdly, the prior art devices utilizing two nested die plates relied on very precise adjustments in the relative rotational position of the two nested die plates in order to control extrusion back pressure. Such precise adjustments required rather intricate and complex operational controls and hence, were not well suited for manual operation in a plant setting.

Thus, there has been a need in the art for a die plate means to be used in conjunction with a face-cutting apparatus having a substantially longer life than the prior art devices.

Further, there has been a need in the art for such a long-life device which has the ability to produce different sizes of thermoplastic pellets without costly shut down, cleaning and refitting procedures.

Still further, there has been a need in the art for a die plate means able to quickly and easily convert from the production of one size (diameter) pellet to another size pellet without readjusting the relative rotational positions of the nested die plates.

Furthermore, there has been a need in the art for a die plate means adaptable for both manual and automatic control of extrusion back pressure without the necessity of precision adjustments to the die plate means.

These and other objects are provided by the apparatus and methods of the present invention.

SUMMARY OF THE INVENTION

The apparatus of the present invention comprises a face cutting apparatus having an extrudate feed means with an extrudate delivery end, a die and a cutter means as well as an apparatus for controlling extrusion back pressure comprising a die having a plurality of extrusion orifices through which a heat-plastified extrudate is adapted to be extruded and also having varying orifice density along the length of the die, pressure sensing means for sensing the pressure adjacent the delivery end of the extrudate feed means and means for moving the die relative to the delivery end in response to changes in the pressure in order to align a die area having a different orifice density with the delivery end in order to adjust both the flow rate of the heat-plastified extrudate through the die and the extrusion back pressure.

BRIEF DESCRIPTION OF THE DRAWINGS

FIG. 2A is a side elevation of a preferred embodiment of a cylindrical die plate, laid out flat in order to view its entire circumference;

FIG. 2B is a sectional view of a cylindrical die plate; and

FIG. 2C is a side elevation of the cylindrical die plate shown in FIG. 2B.

Figure 1:
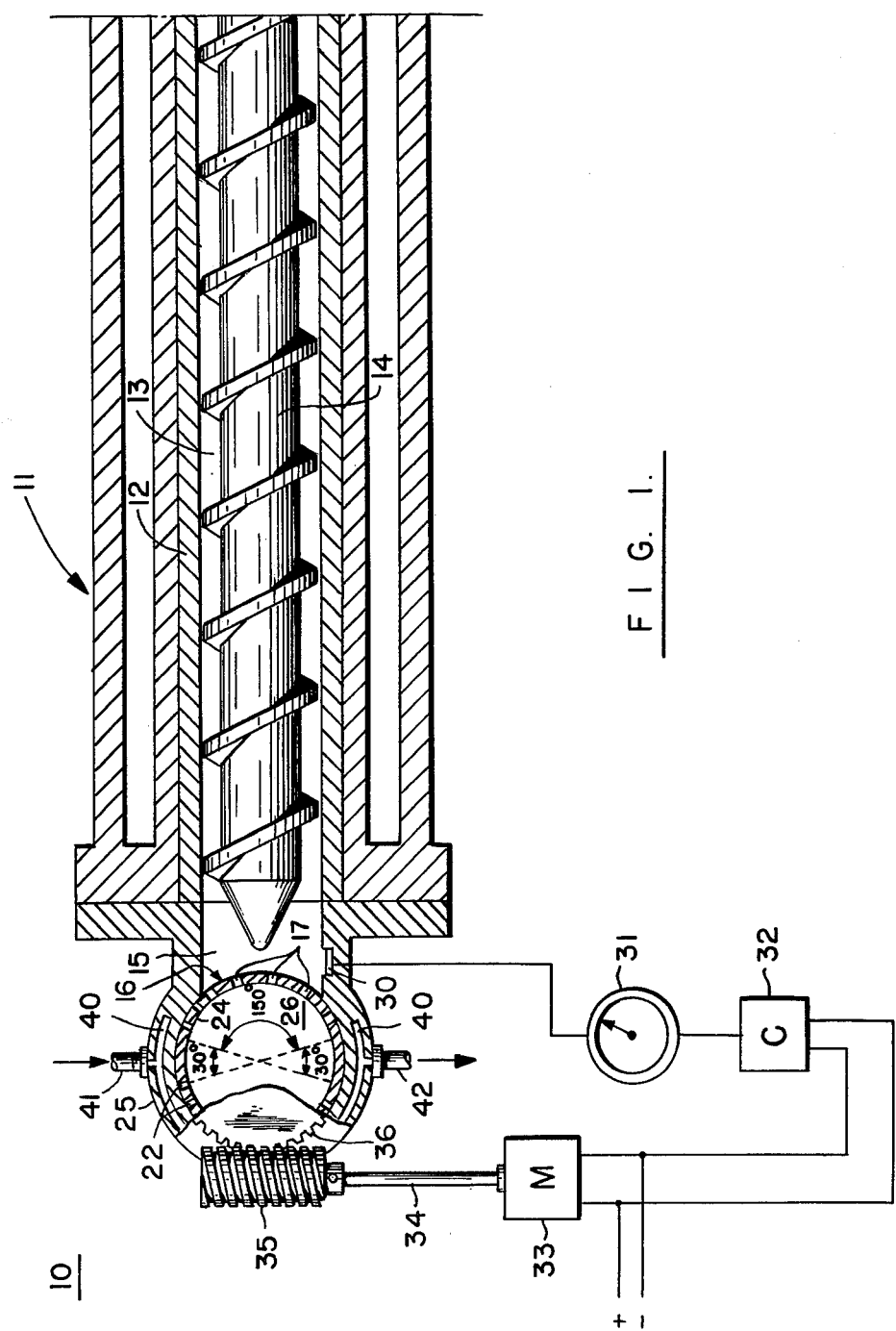
FIG. 1 is a side elevation, partly in section, of a specific embodiment of the present invention.

Although specific forms of apparatus embodying the invention have been selected for illustration in the drawings, and although specific terminology will be resorted to in describing those forms in the specification which follows, their use is not intended to define or to limit the scope of the invention, which is defined in the appended claims.

DESCRIPTION OF THE PREFERRED EMBODIMENTS

Referring to FIG. 1, the face-cutting apparatus is designated generally by reference numeral 10 and is associated with extrusion device 11. Extrusion device 11 comprises an extrusion chamber 12 having a kneading or mixing bore 13. Mounted within bore 13 is a rotatable feed screw 14 driven by a power source (not shown). Downstream of chamber 12 is chamber 15 which is adjacent the delivery end of the extruder bore 13. Heat-plastified material is delivered into chamber 15 by the rotation of screw 14. Fastened to the end of extrusion device 11 is housing 25 containing a cylindrically shaped die plate means 16 having a plurality of radially extending extrusion orifices 17 through which heat-plastified material is extruded due to the pressure built up in chamber 15 by the rotation of screw 14.

A rotary cutter (not shown) is normally positioned within the interior 26 of die plate means 16. Such a cutter is well-known in the art and generally has a cylindrical body mounted for rotation about its longitudinal axis which is aligned with the axis of die plate means 16. The cutter typically has a plurality of blades projecting radially from and extending longitudinally along the cylindrical body in helical fashion. Each of the blades has a cutting edge which is operatively associated with the downstream face 24 of die plate means 16. Thus, there is very little clearance between the cutting edge of the rotary cutter and face 24. As a consequence, heat-plastified material extruded through orifice 17 in a die plate means 16 is sheared by the cutter as it rotates. The resultant pellets formed by the cutting operation have a diameter (assuming that the orifices are circular in cross-section) determined by the downstream size of orifices 17, and a length determined by the speed of rotation of the cutter and the pressure of the heat-plastified material in chamber 15.

Housing 25 is provided with an internal circulation chamber 40 within which conditioning fluid can be circulated by means of conduits 41, 42. This arrangement allows close control of the cutting temperature during the face-cutting operation.

The treatment fluid may be gas or liquid.

During the operation of face-cutting apparatus 10, die plate means 16 is typically oriented such that orifices 17 are aligned with the delivery end of extruder bore 13.

Attached to die plate means 16 is ring gear 36 which meshes with worm gear 35 positioned on the end of shaft 34 of motor 33. Motor 33 is controlled by a control device 32. Control device 32 receives an input from pressure gauge 31 which measures the pressure in chamber 15 through pressure transducer 30. Thus, in response to changes in the pressure in chamber 25, control device 32 activates motor 33 which rotates worm gear 35 thereby causing both ring gear 36 and die plate means 16 to rotate.

FIG. 2B is an enlarged sectional view of the die plate means 16 shown in FIG. 1. As can be clearly seen in FIG. 2B, die plate means 16 has a circular cross-section and has two sets of extrusion orifices 17, 22 each covering approximately 150° of the circumference of die plate means 16. Die plate means 16 also includes areas 50 and 51 having no extrusion orifices.

As can be seen from FIG. 1, chamber 15 abuts against a portion of the total surface area of die plate means 16. This portion comprises approximately 90° along the circumference of die plate means 16. Further, as can be seen in FIG. 2B and 2A, the spacing of the orifices 17 varies along the circumference of die plate means 16. Thus, by rotating die plate means 16 a portion of the die plate area having a different orifice density is brought into alignment with the delivery end of chamber 15. Since extrusion orifices 17 all have the same size (diameter) the different orifice density will result in an effectively greater or lesser orifice area through which the extrudate can flow. This change in the orifice area can be used to either increase or decrease the pressure in chamber 15. Thus, if die plate means 16 is rotated so that extrusion orifices 17 having relatively close spacing is brought into alignment with the delivery end of chamber 15, the extrusion back pressure in chamber 15 will be effectively reduced. On the other hand, if die plate means 16 is rotated to bring extrusion orifices 17 having a relatively large spacing into alignment with the delivery end of chamber 15, the extrusion back pressure in chamber 15 is effectively increased.

As can be seen from the above, the apparatus and methods of the present invention present an effective way of controlling extrusion back pressure.

As can be seen from FIGS. 2A and 2B, die plate means 16 has two sets of extrusion orifices; a set of large extrusion orifices 17 and a set of small extrusion orifices 22. Of course, it will be readily appreciated by those skilled in the art that it is possible to provide more than two sets of extrusion orifices on a single die plate means 16.

Similar to the set of extrusion orifices 17, extrusion orifices 22 also have varying orifice densities along the circumference of die plate means 16. Thus, simply by rotating the die plate means 16 180° it is possible to produce thermoplastic pellets having a smaller diameter and also to have the same controls on the extrusion back pressure due to the varying density of extrusion orifices 22 along the circumference of die plate means 16.

Although this invention has been described in connection with specific forms thereof, it will be appreciated by those skilled in the art that a wide variety of equivalents may be substituted for those specific elements and steps of operation shown and described herein, that certain features may be used independently of other features, and that parts may be reversed, all without departing from the spirit and scope of this invention as defined in the appended claims.

I claim:

1. In a face cutting apparatus having an extrudate feed means with an extrudate delivery end, a die means and a cutter means, an apparatus for controlling extrusion back pressure comprising:
   a. a die having a plurality of extrusion orifices through which an extrudate is adapted to be extruded and having a varying orifice density along the length of the die;
   b. pressure sensing means for sensing the pressure adjacent said delivery end; and
   c. means for moving said die relative to said delivery end in response to changes in the pressure adjacent said delivery end to align a die area of differing orifice density with said delivery end in order to adjust the extrudate flow rate and the extrusion back pressure.

2. The apparatus as described in claim 1, wherein said die is hollow, cylindrically shaped and is rotatable on its axis.

3. The apparatus as described in claim 2, wherein the orifice density of the die varies along its circumference.

4. A method for controlling extrusion back pressure, in a face cutting apparatus having an extrudate feed with an extrudate delivery end, a die and a cutter, comprising:

a. sensing the pressure adjacent said delivery end;

b. operatively positioning the die downstream from said delivery end, said die having a plurality of extrusion orifices through which an extrudate is adapted to be extruded, and having a varying orifice density along the length of the die; and c. moving said die relative to said delivery end in response to changes in the pressure adjacent said delivery end to align a die area of differing orifice density with said delivery end in order to adjust the extrudate flow rate and the extrusion back pressure.

* * * * *